United States Patent [19]

Griffin, III

[11] Patent Number: 5,207,952

[45] Date of Patent: May 4, 1993

[54] SIDE CHAIN LIQUID CRYSTALLINE POLYMERS AS NONLINEAR OPTICAL MATERIALS

[75] Inventor: Anselm C. Griffin, III, Hattiesburg, Miss.

[73] Assignee: University of Southern Mississippi, Hattiesburg, Miss.

[21] Appl. No.: 682,841

[22] Filed: Apr. 2, 1991

Related U.S. Application Data

[63] Continuation of Ser. No. 342,634, Apr. 20, 1989, abandoned, which is a continuation of Ser. No. 917,710, Oct. 10, 1986, abandoned.

[51] Int. Cl.$^5$ .................. F21V 9/00; C09K 19/52; C08G 67/24
[52] U.S. Cl. .................. 252/582; 252/299.01; 528/289; 528/290; 528/292; 528/293; 528/295; 528/308
[58] Field of Search .................. 252/299.01, 582, 587, 252/589; 528/289, 290, 292, 293, 295, 308

[56] References Cited

U.S. PATENT DOCUMENTS

| | | | |
|---|---|---|---|
| 4,229,498 | 10/1980 | Suzuki et al. | 252/299.01 |
| 4,293,435 | 10/1981 | Portugall et al. | 252/299.01 |
| 4,358,391 | 11/1982 | Finkelmann et al. | 252/299.1 |
| 4,431,263 | 2/1984 | Garito | 252/299.01 |
| 4,536,450 | 8/1985 | Garito | 252/299.01 |
| 4,558,391 | 11/1982 | Finkelmann et al. | 252/299.01 |
| 4,579,915 | 4/1986 | Choe | 252/299.01 |
| 4,603,187 | 7/1986 | Choe | 252/299.01 |
| 4,605,869 | 8/1986 | Choe | 252/299.01 |
| 4,607,095 | 8/1986 | Kuder | 252/299.01 |
| 4,631,328 | 12/1986 | Ringsdorf et al. | 252/299.01 |
| 4,681,919 | 7/1987 | Yuki et al. | 525/292 |
| 4,694,066 | 9/1987 | DeMartino et al. | 528/373 |
| 4,702,558 | 10/1987 | Coles et al. | 252/299.1 |
| 4,713,196 | 12/1987 | Praefcke et al. | 252/299.1 |
| 4,755,574 | 7/1988 | Choe | 252/299.01 |
| 4,757,130 | 7/1988 | DeMartino | 252/299.01 |
| 4,762,912 | 8/1988 | Leslie et al. | 252/299.01 |
| 4,779,961 | 10/1988 | DeMartino | 252/299.01 |
| 4,795,664 | 1/1989 | DeMartino | 252/299.01 |
| 4,801,670 | 1/1989 | DeMartino et al. | 252/299.01 |
| 4,808,332 | 2/1989 | DeMartino et al. | 252/299.01 |
| 4,810,338 | 3/1989 | DeMartino et al. | 252/299.01 |
| 4,835,235 | 5/1989 | DeMartino et al. | 252/299.01 |
| 4,894,263 | 1/1990 | Dubois et al. | 428/1 |
| 4,935,292 | 6/1990 | Marks et al. | 428/220 |

OTHER PUBLICATIONS

"DARPA/DSO-AFOSR/NC Optical Processing Annual Review", 1984.
A. Blumstein, et al. "Thermotropic Liquid-Crystalline Polymers with Mesogenic Groups and Flexible Spacers in the Main Chain", Thermotropic Liquid-Crystalline Polymers, pp. 311-345.
G. R. Meredith, J. G. Vandusen, and D. J. Williams, "Optical and Nonlinear Optical Characterization of Molecularly Doped Thermotropic Liquid Crystalline Polymers", Macromolecules, 1982 pp. 1385-1389.
R. V. Tal'roze et al. "Influence of the Structure of Mesogenic Groups the Structure and Dielectric Properties of the Comb-like Liquid Crystalline Azomethyne containing Polymers", Advances in Liquid Crystal Research and Applications, (1980) pp. 915-924.
V. P. Shibaev, et al., "Liquid Crystal Polymers II/III", 1984.
A. F. Garito, et al. "Mol. Cryst. Liq. Cryst." 106, (1984) p. 219.

(List continued on next page.)

Primary Examiner—Robert L. Stoll
Assistant Examiner—Shean C. Wu
Attorney, Agent, or Firm—Arnold, White & Durkee

[57] ABSTRACT

Side chain liquid crystalline polymers which exhibit nonlinear optical responses, particularly second and third harmonic generation, are presented together with methods for making them. These polymers derive their nonlinear optical behavior from selective pendant groups that are attached via spacers to the backbone. Several embodiments having chiral structures are subject to efficient dipolar and molecular alignment by electric field poling. The methods disclosed for making these polymers are polycondensation, graft polymerization, and copolycondensation.

40 Claims, No Drawings

OTHER PUBLICATIONS

A. F. Garito et al., "Fundamental Nonlinear Optics Issues in Organic and Polymer Systems," SPIE vol. 682, Molecular and Polymeric Optoelectronic Materials: Fundamentals and Applications, (1986) pp. 2–11.

G. Khanarian, et al., "Electrooptic and Third Harmonic Generation Studies of Polymer Alloys and Solutions", SPIE vol. 682, Molecular and Polymeric Optoelectronic Materials: Fundamentals and Applications, (1988) pp. 153–158.

P. Le Barny, et al., "Some New Side-Chain Liquid Crystalline Polymers for Nonlinear Optics", SPIE vol. 682, Molecular and Polymeric Optoelectronic Materials: Fundamentals and Applications, (Aug. 21–22, 1986) pp. 56–64.

G. F. Lipscomb, et al., "Optical Nonlinearities in Organic Materials: Fundamentals and Device Applications", SPIE vol. 682, Molecular and Polymeric Optoelectronic Materials: Fundamentals and Applications, (1986) pp. 125–131.

G. R. Meredith, et al. "Design and Characterization of Molecular and Polymeric Nonlinear Optical Materials: Success and Pitfalls", D. J. Williams, ed., ACS Symp. SN 233, Washington, D.C., (1983) p. 27.

G. R. Meredith, et al. "Characterization of Liquid Crystalline Polymer for Electrooptic Applications", ACS Symp. SN 233, Washington, D.C., (1986) p. 109.

B. Reck, and H. Ringsdorf, "Combined Liquid Crystalline Polymers: Mesogens in the Main Chain and as Side Groups", Makromol. Chem., Rapid Comun., 6, (1985) pp. 291–299.

H. Ringsdorf, and H. Schmidt, "Electro-Optical Effects of Azo Dye Containing Liquid Crystalline Copolymers", Makromol. Chem. 185, (1984) p. 1327.

J. B. Stamatoff, et al., "Development of Polymeric Nonlinear Optical Materials", SPIE vol. 682, Molecular and Polymeric Optoelectronic Materials: Fundamentals and Applications, (1986) pp. 85–92.

R. J. Twieg and K. Jain: "Organic Materials for Optical Second Harmonic Generation", ACS Symp. SN 233, Washington, D.C., (1983) p. 57.

D. J. Williams, "Organic Polymeric and Non-Polymeric Materials with Large Optical Nonlinearities", Angew. Chem. Int. Ed. Engl., 23, (1984) p. 690.

James F. Wolfe, "Rigid Aromatic Heterocyclic Polymers for Nonlinear Optics", SPIE vol. 682, Molecular and Polymeric Optoelectronic Material Fundamentals and Applications, (1986) pp. 70–76.

J. S. Zyss, et al., "Demonstration of Efficient Nonlinear Optical Crystals with Vanishing Molecular Dipole Moment: Second-Harmonic Generation in 3-methyl-4-nitropyridine-1-oxide", J. Chem. Phys., 74, (1981) p. 4800.

Tal'roze, R. V. et al. in "Adv. in Liquid Crystal Research and Applications", L. Bata ed. Pergamon Press, Oxford 1980 p. 915.

Shibaev et al., Liquid Crystal Polymers II/III, pp. 176–179, 190–191 (1984).

Blumstein et al., Liquid Crystals and Ordered Fluids, vol. 4, pp. 311–345 (1984).

Meredith et al., macromolecules, vol. 15, pp. 1385–1389 (1982).

SIDE CHAIN LIQUID CRYSTALLINE POLYMERS AS NONLINEAR OPTICAL MATERIALS

This invention was made at least in part with Government support under Grant AFOSR-84-0249, which was granted by the U.S. Department of Defense. The Government may have certain rights in this invention.

This application is a continuation of application Ser. No. 342,634, filed Apr. 20, 1989, now abandoned, which is a continuation of application Ser. No. 917,710, filed Oct. 10, 1986, now abandoned.

BACKGROUND OF THE INVENTION

1. Field of the Invention

The invention relates generally to side chain liquid crystalline polymers exhibiting nonlinear optical responses. More particularly, the side chain polymer is made up of pendant groups attached via flexible spacers to a polymer backbone. Chiral structures in the polymer backbone or in other pendant groups give the polymer non-centrosymmetry while the nonlinear optical and liquid crystalline properties come primarily from the pendant groups. The organic, polymeric, nonlinear optical, and liquid crystalline properties may all exist simultaneously within a single physically homogeneous medium.

2. Description of the Related Art

Nonlinear optics has become significant in recent years due to the telecommunications industry's search for materials capable of high-speed optical signal processing, the development of increasingly sophisticated laser technology, and the possibilities of using fiber optic technology in computers. Nonlinear optics deals with the interactions of incident electromagnetic fields with various substances, such as thin films, crystals, or fiber strands. The resultant optical fields can be altered from the incident fields in phase, frequency, amplitude, and other propagation characteristics.

It is known in the art that certain organic and polymeric materials exhibit greater nonlinear optical (nlo) response than inorganic crystals. As organic materials, they are resistant to damage by powerful lasers and have large dipole moment changes upon pi-electronic excitation. They also offer a great variety of molecular structures to optimize nlo response. Further, as polymers, they have advantages such as improved mechanical strength, processability, and the capacity to form thin films of high optical quality. Inexpensive lenses, prisms, anti-reflection coatings, and fiber optics are but a few of the plastic components that can be easily produced through the use of polymers.

It has been demonstrated that large delocalized pi-electron systems are largely responsible for the nlo response in organic and polymeric materials. The presence of pi-donor and pi-acceptor groups conjugated through an extended molecular framework is conducive to very rapid response times upon pi-electronic excitation. Aromatic nitro compounds in which a pi-electron donor such as oxygen or nitrogen is conjugated with the pi-electron acceptor nitro is one species having such large delocalized pi-electron systems. Polymeric compounds, such as polyacetylenes, also possess conjugated pi-electron systems, but do not necessarily have pi-donor and pi-acceptor groups.

Organic-based nlo materials hold great promise for use in various optical communications technologies such as high-speed optical switches and optical fibers. Other applications include optical wave guides for high resolution lithography, frequency doublers for semiconductor lasers, and optical signal processing. The molecular engineering and desired geometric and electronic features of new nlo materials have a complementary aspect in that many of the ultrastructural considerations are required for, or conducive to, the design of organic ferroelectric and piezoelectric materials.

One disadvantage of existing organic and polymeric materials is that multicomponent systems, such as "guest-host" systems, must be used in order to achieve both nonlinear optical and liquid crystalline properties in a single material. It is common to use a physical mixture of components, e.g., a polymer and a chromophore. A chromophore (dye) monomer "guest" must be added to an ordinary liquid crystalline polymer "host" to produce a multicomponent and possibly multiphase system.

Another disadvantage of existing organic and polymer nlo materials is that electric field poling is necessary to align the molecules and dipoles.

As discussed previously, organic and polymeric molecules derive their nonlinear optical properties from pi-electronic interactions within the molecule. Pi-electronic interactions vary with the molecular structure. This nonlinear optical behavior can be expressed in terms of the dipolar approximation with respect to the polarization induced in an atom or molecule by an external field. Twieg and Jain, using the fundamental equation (1), explain that in the dipolar approximation the change in dipole moment, $\Delta\mu$, of an individual molecule upon interaction with the electric component of electromagnetic radiation is described as a power series of the electric field strength E as given by equation (1) where $\mu_e$ and $\mu_g$ are the molecular excited state and ground state dipole moments, respectively.

The coefficient $\alpha$ is the linear polarizability; $\beta$, the quadratic hyperpolarizability; and $\gamma$, the cubic hyperpolarizability, etc.

$$\Delta\mu = \mu_e - \mu_g = \alpha E + \beta EE + \gamma EEE + \quad (1)$$

$$P = P_o + \chi^{(1)}E + \chi^{(2)}EE + \chi^{(3)}EEE + \quad (2)$$

Upon scaling from a single molecule to an array of molecules, i.e., a crystal, the appropriate expression becomes that in (2) where P is the macroscopic polarization and the meaning of the coefficients $\chi^{(1)}$, $\chi^{(2)}$ and $\chi^{(3)}$ is similar to their counterparts $\alpha$, $\beta$ and $\gamma$ in the microscopic description. Equation (2) is identical with (1) except that it describes a macroscopic polarization, such as that arising from an array of molecules in a crystal. The odd order coefficients are not symmetry dependent and are always non-vanishing. Even order coefficients, however, are dependent on symmetry and go to zero for centrosymmetric materials. The quadratic hyper-polarizability $\chi^{(2)}$ governs second harmonic generation (SHG). Thus, a material must be non-centrosymmetric to provide SHG. The odd order coefficient $\chi^{(3)}$ is responsible for third harmonic generation (THG).

Coherent light waves passing through an array of molecules can interact with them to produce new waves; this interaction may be interpreted as resulting from a modulation in refractive index or alternatively as a nonlinearity of the polarization. Such interaction occurs most efficiently when certain phase matching conditions are met, requiring identical propagation speeds of the fundamental wave and the harmonic wave. Birefringent crystals often possess propagation directions in which the refractive index for the fundamental $\omega$ and the second harmonic $2\omega$ are identical so that dispersion may be overcome.

Referring generally to liquid crystalline technology, it is known that thermotropic liquid crystals are prepared by heating. When the solid is heated, it transforms into a turbid system that is fluid and birefringent. Upon cooling, the material converts back from isotropic liquid to liquid crystal to solid. Side chain liquid crystalline polymeric substances are able to align with the major axes of pendant groups statistically parallel over a significant distance. While in a liquid crystalline phase the molecules can be easily aligned uniformly over a still greater distance, that is, macroscopically aligned with an external electromagnetic field. The molecules may then be frozen into a glassy phase upon cooling.

This liquid crystalline (mesomorphic) state of matter has the ability to combine long range as well as short range characteristics. These liquid crystals exist in two major structural arrangements or phases. The two phases, nematic and smectic, are each characterized by parallelism of the major molecular axes. The nematic phase allows for translational mobility of constituent molecules, and when heated, generally transforms into the isotropic phase. The smectic phase is composed of molecular layers in which translational mobility is minimal.

There are a variety of smectic phases differing in the ordering of molecules within the same layer, the tilt of the "average" molecular axis with respect to the layer plane, and the positional correlation of molecules in different layers. A common example is the smectic type A. Recently, the chiral smectic C phase has been shown to be ferroelectric. Another development is a working electro-optical device based on coupling the spontaneous polarization to an applied electric field. Also, there is a particular liquid crystal known as the smectic D, which not only shows a three-dimensional ordering but is also optically isotropic. A further structural arrangement, the cholesteric phase, is locally similar to the nematic phase, but is composed of chiral molecules, i.e., a chiral nematic.

SUMMARY OF THE INVENTION

The present invention offers a new class of compounds, namely side chain liquid crystalline polymers that exhibit nonlinear optical (nlo) behavior, specifically second and third order nonlinear optical responses. It is known that certain organic materials possess nlo properties. However, this invention provides organic compounds that are polymeric, liquid crystalline, and optically nonlinear, all in a physically homogeneous medium. The side chain liquid crystalline polymer of the invention is made up of pendant groups attached via flexible spacers to a polymer backbone. The nonlinear optical and liquid crystalline properties of the polymer come primarily from these pendant groups. The compounds are preferably "non-centrosymmetric", that is, they do not have a center of symmetry on either the molecular or macroscopic level. Chiral structures in the polymer backbone or in other pendant groups provide non-centrosymmetry in the polymer.

The compounds of the present invention and their method of manufacture can be used in thin film applications, sophisticated laser tools, and any technology that utilizes organic nonlinear optic materials. One method of making such a compound is polycondensation, where a single monomer, such as a diester malonate, is added to a diol. Another method is copolycondensation, described in Example 8, where two different monomers are added together with a diol to yield a single polymer. A third method is graft polycondensation, described in Example 8.

Another advantage is that these polymers may be easily processed into thin films or other desired forms. Accordingly, one may apply the nonlinear optical liquid crystalline phenomena of the present invention to the sophisticated thin film technology that has developed in recent years.

A further advantage of the present invention is that a wide range of side chain liquid crystalline polymers may be formed, because the species of polymer backbone is not particularly important. The polymer structure, however, should be sufficiently flexible to permit liquid crystalline behavior in the pendant groups, which form the side chains. This flexibility may be provided in the backbone or in the "spacers" which attach the pendant groups to the backbone.

As liquid crystalline (mesogenic) materials these side chain polymers are easily and efficiently oriented by electromagnetic fields both with respect to their director and dipolar orientation. They possess long (and short) range positional order through cooperative molecular orientation even in the quiescent liquid crystalline phase. Electric poling of the liquid crystalline (aligned) phase and subsequent freezing of this orientation into a glassy solid state retains molecular and dipolar orientation.

It has been found that chiral structures in the polymer help create non-centrosymmetry in the polymer and may even eliminate the need for electric field poling. In one embodiment the chiral structure is found in the backbone, while in another the chiral structure is found in a plurality of pendant groups. These chiral structures facilitate dipolar alignment when dc electric fields are applied. There is a natural tendency for strongly polar compounds, such as side chain polymers, to crystallize or solidify in an antiparallel dipolar arrangement resulting in a centrosymmetric structure. Normally, electric field poling must be used to create a non-centrosymmetric environment; that is, an external electric field is applied to an organic substrate such as a thin film. However, when chiral structures are present in the polymer, the dipoles and molecules are more easily aligned by dc electric fields. This may obviate the need for electric field poling. Specific embodiments of the chiral structures or groups of the invention derived from diols are 1-methyl-1,3-propylene, and 3-methyl-1,6-hexylene. A nonchiral structure, 1,4-butylene, also derived from a diol, may be substituted for the chiral structure if non-centrosymmetry is not required.

A "spacer", generally an alkyl group, is used to attach each pendant group to the backbone. The species of the spacer is not important, but it must be long and flexible enough to permit liquid crystalline behavior in the polymer.

The side chain pendant group is where the present invention derives both its nlo and its liquid crystalline properties. This pendant group should have a pi-electron donor and a pi-electron acceptor, which supply the pi-electronic interactions which in turn produce the desired nlo response. The preferred embodiment has the donor and acceptor positioned opposite one another, i.e., in the para position, to permit optimal pi-electron conjugation. An example of such a preferred embodiment may be expressed in terms of chemical structure as follows:

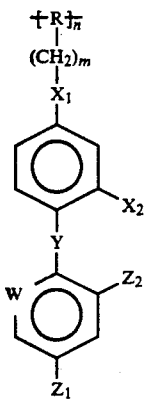

where $X_1$ is a pi-electron donor, $Z_1$ is a pi-electron acceptor, W is CH or N, Y is a linking group, $X_2$ is $X_1$ or H, and $Z_2$ is $Z_1$ or H.

The term "pi-electron donor" describes organic molecules or functional groups which contribute pi-electrons when electromagnetic energy polarizes the conjugated electronic structure. In various embodiments, as shown above, the pi-electron donor $X_1$ may be oxygen or nitrogen.

The term "pi-electron acceptor" describes organic molecules or functional groups which attract pi-electrons when electromagnetic energy polarizes the conjugated electronic structure. In various embodiments, as shown above, the pi-electron acceptor $Z_1$ may be $NO_2$ or CN.

The pi-electron donor and acceptor must be conjugatively connected through a pi-electron framework. The linking group permits the transmission of pi-electron density from $X_1$ to $Z_1$. Illustrations of suitable linking groups Y are

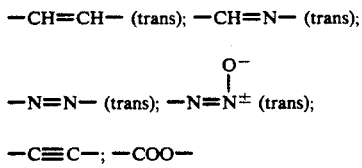

The preferred method is polycondensation, described in detail in Examples 1–6. Graft polymerization is described in Example 7, and copolycondensation is described in Example 8.

DETAILED DESCRIPTION AND PREFERRED EMBODIMENT

An important aspect or object of the present invention is to provide a side chain polymer with side chains or pendant groups which impart desired properties to the polymers. A preferred group of compounds for the purposes of the present invention is formed by reacting chiral diols with "target" monomers having the desired liquid crystalline/nlo pendant group at the 2-position of diethyl malonate. Some of the following specific examples show how these "target" monomers and compounds are made. Examples 1–6 show how a polycondensation reaction is preferably used for this purpose. However, graft polymerization may also be used (Example 8) to graft a desired liquid crystalline pendant group onto a preformed polymer backbone, such as a polyacrylate. Copolycondensation (Example 9) may also be used, i.e., by producing a side chain polymer that has both liquid crystalline nonlinear optical pendant groups and liquid crystalline chiral pendant groups attached in a random fashion to the same backbone.

The following examples are provided for the purpose of illustrating the invention in greater detail, and shall not be taken as limiting the scope of the invention.

EXAMPLE 1

Sample 1 is a target monomer having the following structure:

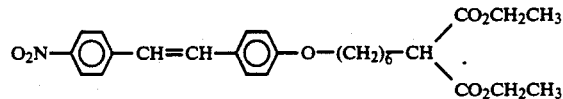

This monomer was generally made by reacting diethyl 6-bromohexylmalonate and 4-hydroxy-4'-nitrostilbene in reflux acetone in the presence of potassium carbonate. The diethyl 6-bromohexylmalonate was prepared as follows: Sodium sand was prepared by melting sodium (9.0 g.; 0.39 mol) in dry xylene (200 ml) followed by vigorous stirring. The resulting mixture was allowed to cool to room temperature while continuing stirring. Then diethyl malonate (62 ml. 0.41 mol) was added dropwise and the reaction flask cooled as necessary to keep the temperature below 30° C. After completion of the addition, the mixture was allowed to stand overnight at room temperature. Next morning, 1,6-dibromohexane (142.7 g.; 0.58 mol) was added in one installment and the mixture gently heated with stirring. After the initial vigorous reaction subsided, the mixture was refluxed for a further 4 hours and then cooled to room temperature. Sodium bromide, which had settled down, was filtered off and xylene was subsequently removed by simple distillation. The residual product mixture was distilled under vacuum. The fraction coming over at 157°–160° C./3 torr corresponded to the expected product. Yield was 57.3 g. (46%) and the boiling point as reported by Buchta, E., Fischer M., Chem Ber., 1966, 99, 1509 was 185°–187° C./10 torr.

Next, the above-described diethyl 6-bromohexylmalonate (7.11 g; 0.022 mol), together with a mixture of 4-hydroxy-4'-nitrostilbene (5.0 g., 0.02 mol) (prepared by the procedure reported in Cullinae, M. M., J. Chem. Soc., 1923, 123, 2056.), powdered anhydrous potassium carbonate (3.73 g, 0.027 mol), and dry acetone (75 ml) was stirred and refluxed for 120 hours. After being allowed to cool to room temperature, the reaction mixture was filtered. Thin layer chromotography (TLC) of the filtrate on alumina plate showed complete disappearance of 4-hydroxy-4'nitrostilbene and appearance of a new spot. Rotary evaporation of the filtrate to dryness and recrystallization of the yellow residue from ethyl acetate/heptane gave 9.2 g (92%) of pure (Sample 1) target monomer, m.p. 118°–119° C.

EXAMPLE 2

Sample 2 is the preferred embodiment of the invention made by reacting the target monomer of Sample 1 with an excess of nonchiral diol, specifically 1,4-butanediol. Samples 3 and 4, also embodiments, were made by reacting the target monomer of Sample 1 with an excess of chiral diol, i.e., 3-methyl-1,3-propanediol and 3-methyl-1,6-hexylenediol, respectively. Samples 2, 3 and 4 have the following structure:

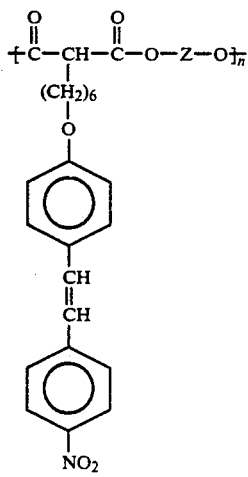

in which Z is, respectively, 1,4-butylene, 1-methyl-1,3-propylene, and 3-methyl-1,6-hexylene. The reactions for making Samples 2, 3 and 4 all followed in a general way the procedure reported by Reck and Ringsdorf, *Makromol. Chem, Rapid Commun.*. 6, 291 (1985). The procedure for making Sample 3 is described in detail below.

The target monomer of Sample 1 (3.00 g., 6.21 mmol) and 3-methyl-1,6-hexanediol (0.86 g., 6.52 mmol) were weighed in a 25 ml round-bottom flask which was then fitted with a 2-neck tube. One of the necks was stoppered with a rubber septum and secured with copper wire. Through the septum a long 18-gauge stainless-steel needle was inserted for nitrogen supply. The second neck of the tube was used for applying vacuum. The flask was immersed in an oil bath, and the reaction mixture was melted at 120° C. while blowing dry nitrogen through the needle. Then the needle was immersed in the melt and one drop of titanium isopropoxide was injected through the septum. The reaction was carried out at atmospheric pressure for 19 hours at 120° C. while using slow nitrogen flow to stir the melt. Then vacuum was gradually applied for 9 hours. After this the pressure was lowered to 2 torr and the reaction carried out for 11 hours at 130° C., 5 hours at 135°-140° C. and 8 hours at 150°-155° C. After cooling, the polymer was dissolved out with chloroform, filtered, and precipitated with diethyl ether. Two more dissolutions in chloroform and precipitations with diethyl ether were subsequently performed. Yield of the polymer of Sample 3, after drying under vacuum, was 2.27 g. (70%).

EXAMPLE 3

Sample 5 is target monomer having the following structure.

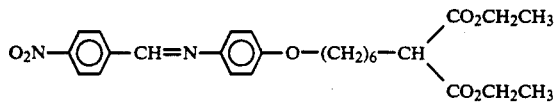

and was formed by the following procedure which involved several preparations.

First, diethyl 6-(4-acetamidophenoxy)hexylmalonate was prepared as follows: A mixture of 4-acetamidophenol (20.0 g, 0.13 mol), diethyl 6-bromohexylmalonate (45.0 g, 0.14 mol), powdered anhydrous potassium carbonate (22.4 g, 0.16 mol), and dry acetone (200 ml) was stirred and refluxed for 120 hours. After cooling to room temperature, the reaction mixture was filtered. TLC of the filtrate on alumina plate showed complete disappearance of 4-acetamidophenol and appearance of a new product spot. The filtrate was evaporated to dryness and the residue recrystallized from ethyl acetate/heptane to give 30.3 g (59%) of white product crystals; m.p. 59°-60° C.

Then, diethyl 6-(4-aminophenoxy)hexylmalonate was formed by hydrolyzing diethyl 6-(4-acetamidophenoxy) hexylmalonate (30.0 g, 0.076 mol) by refluxing in 50:50 (v/v) concentrated hydrochloric acid/95% ethanol (100 ml) for 3 hours. The resulting solution was neutralized with slow addition of saturated sodium bicarbonate solution while stirring. It was then allowed to stand an additional 1 hour. The product was extracted with ether (3×50 ml). TLC of the extract on alumina plate showed complete disappearance of the starting amide and appearance of a new spot. Removal of ether by rotary evaporation gave 12.1 g (49%) of the desired product. Rapid decomposition (oxidation) prevented standard characterization of this material. It was used immediately in the next reaction step.

Finally, Sample 5 itself was formed by refluxing 4-nitrobenzaldehyde (1.5 g, 0.01 mol) and diethyl 6-(4-aminophenoxy) hexylmalonate (3.5 g, 0.01 mol) were refluxed in absolute ethanol (30 ml) for 2 hours and then cooled to room temperature. The product crystals so formed were separated by filtration and recrystallized from absolute ethanol to give 4.4 g (92%) of yellow crystals; m.p. 102.5° C.

EXAMPLE 4

Samples 6, 7, and 8 are specific embodiments of polymers of the invention made by reacting the Sample 5 target monomer with, respectively, 1,4-butanediol, 3-methyl-1,3-propanediol, and 3-methyl-1,6-hexanediol. The general procedure used to produce these polymers is the polycondensation reaction described in Example 2. Samples 6, 7 and 8 have the following structure:

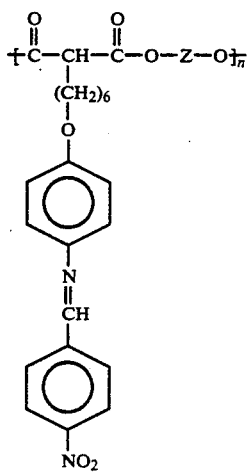

in which Z is, respectively, 1,4-butylene, 1-methyl-1,3-propylene, and 3-methyl-1,6-hexylene.

EXAMPLE 5

Sample 9 is a target monomer having the following structure.

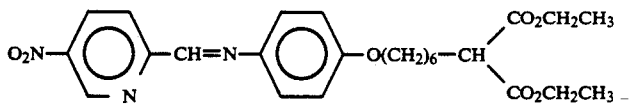

Sample 9 was formed by refluxing a mixture of diethyl 6-(4-aminophenoxy) hexylmalonate (3.5 g, 0.01 mol) (see Example 3) and 5-nitropyridine 2-carboxaldehyde (1.5 g, 0.01 mol), (prepared earlier by a procedure reported by Achremowicz, L., Syper, L., Rocz. Chem., 1972, 46, 409) in absolute ethanol (50 ml) for 2 hours and then allowed to cool to room temperature whereupon crystals of the product were deposited. After separation by filtration, the product was recrystallized from absolute ethanol to get 4.3 g (89%) of orange crystals; m.p. 112°–113° C.

EXAMPLE 6

Samples 10, 11, and 12 are specific embodiments of the invention carried out by reacting the Sample 9 target monomer with, respectively, 1,4-butanediol, 3-methyl-1,3-propanediol, and 3-methyl-1,6-hexanediol. The procedure used to produce these compounds is the same general polycondensation procedure described in Example 2.

Samples 10, 11 and 12 have the following structure:

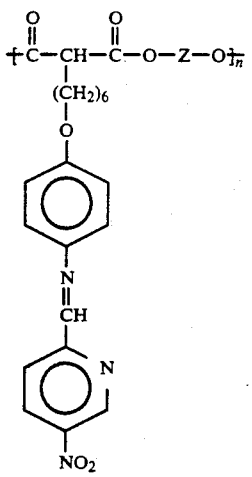

in which Z is, respectively, 1,4-butylene, 1-methyl-1,3-propylene, and 3-methyl-1,6-hexylene.

EXAMPLE 7

Table 1 below lists several properties of the samples described in Examples 1-6 above. Samples 1,5 and 9 are the target monomers used to make the corresponding polymers. The liquid crystalline properties of the various polymers were determined by optical microscopy and thermal analysis after being purified by repeated precipitation by a nonsolvent.

TABLE 1

| Sample | Mesophase | (°C.) Phase Transition Temperature | λmax (nm) | λcutoff (nm) |
|---|---|---|---|---|
| 1 | — | — | 253,379 | 474 |
| 2* | N | 122.7 | 253,379 | 474 |
| 3 | S$_A$ | 98.0 | 255,378 | 471 |
| 4 | S$_X$ | 58.7 | 253,379 | 468 |
| 5 | — | — | 265,382 | 488 |
| 6* | N | 73.0 | 263,380 | 488 |
| 7 | S$_X$ | 49.7 | 262,381 | 488 |
| 8 | N | 30.7 | 262,379 | 486 |
| 9 | — | — | 257,394 | 500 |
| 10* | S$_A$ | 103.8 | 257,394 | 490 |
| 11 | S$_A$ | 71.5 | 254,393 | 508 |
| 12 | S$_A$ | 71.9 | 257,394 | 495 |

All nine polymers were liquid crystalline (mesomorphic). For several samples the melting and/or glass transition behavior was somewhat complex. As a result, Table 1 only describes the high temperature mesophase. The nematic phase is symbolized by an N. The identifiable smectic phase type A is symbolized by an S$_A$, while S$_X$ represents an unidentified liquid crystalline smectic phase A star (*) represents a nonchiral polymer and mesophase. All other polymers are chiral. The phase transition temperature reflects the transition from liquid crystalline (mesogenic) to isotropic.

Table 1 also shows the uv-vis (visible) data for Samples 1-12. The maximum wave lengths are shown as two values, each representing a uv absorption peak in the spectrograph reading. The uv-cutoff points indicate where the spectra returned to baseline. Finally, the spectroscopic values for the monomers, i.e., Samples 1, 5, and 9, show that the chromophore, i.e., the pendant group in the malonate monomer, is essentially unaffected by the polymerization.

EXAMPLE 8

Graft polymerization in accordance with the present invention can be achieved by following the general procedure reported by Keller, P., Macromol., 1985, 18, 2337. In this Example, the backbone is of the acrylate type, specifically poly(itaconic acid). First, 0.232 g. poly(itaconic acid) was dissolved in 8 ml of 1N sodium hydroxide, then diluted to 20 ml total volume. Added to this was a chloroform solution, made by dissolving 1.75 g. of the compound with the following structure

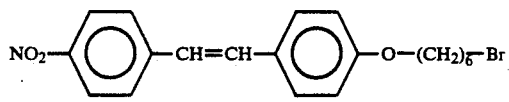

in 40 ml of chloroform. To this mixture was added 0.25 g. tetrabutylammonium bromide. The resulting mixture was refluxed in an oil bath for 96 hours, then cooled to room temperature.

Next, a large volume (200 ml) of chloroform was added, after which the organic layer was separated from the water layer. The organic layer was then washed with two consecutive water washings of 150 ml water each, and dried over sodium sulfate. After the chloroform evaporated, residual solid was dissolved in 20 ml chloroform, just enough to get the solid into solution. Approximately 400 ml methanol (excess) was then added to the chloroform solution. After the polymer precipitated, it was filtered and dried under a vacuum. Yield was 45%. The structural formula for the polymer product is:

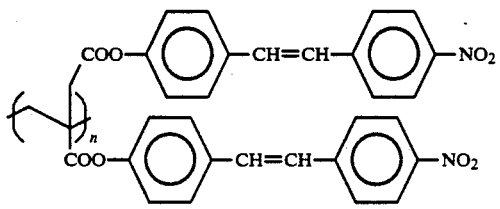

Liquid crystallinity was determined visually using optical microscopy.

EXAMPLE 9

A copolycondensation in accordance with the present invention was carried out procedurally in a manner virtually identical to the polycondensation reaction described in Example 2, with several minor differences. The essential difference was in the reactants used. Thus, each mole of Sample 1 in Example 2 was replaced by 0.5 mol of Sample 1 and 0.5 mol of a chiral alkoxy malonate having a chiral alkoxy in the pendant group. This particular chiral alkoxy malonate was formed by refluxing 4-(2-methyl butoxy)benzaldehyde (1.5 g., 0.01 mol) and diethyl 6-(4-aminophenoxy) hexylmalonate (3.5 g, 0.01 mol) in absolute ethanol (30 ml) for 2 hours and then cooled to room temperature. The product crystals so formed were separated by filtration and recrystallized from absolute ethanol. The chiral alkoxy malonate was then reacted with the target monomer (Sample 1) and an excess of 1,4 butane diol to produce the desired polymer. The chiral alkoxy malonate is represented structurally below.

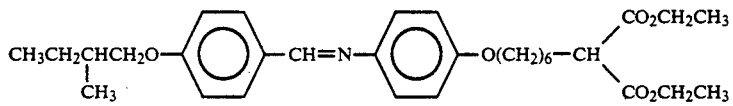

The resulting side chain liquid crystalline polymer comprises a backbone with the following structure,

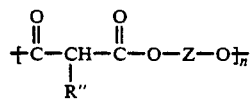

R″ representing either of the following two pendant groups, so that the backbone comprises both pendant groups randomly spaced along the backbone:

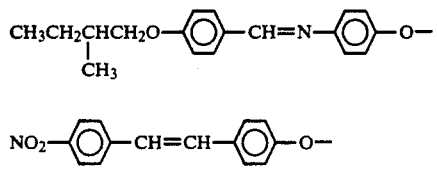

What is claimed is:

1. A composition of matter, comprising a liquid crystalline, noncentrosymmetric polymer having a polymeric backbone and a plurality of dipolar pendant groups attached at intervals along the backbone; said dipolar pendant groups comprising a pi-electron donor and a pi-electron acceptor that comprises $NO_2$ or CN and is conjugatively connected to the pi-electron donor.

2. The composition of claim 1, in which the dipolar pendant groups have been oriented by an electric field.

3. The composition of claim 1, wherein said polymer has been electrically poled.

4. The composition of claim 1, in which said dipolar pendant groups have been electrically poled to provide said noncentrosymmetry to said polymer.

5. The composition of claim 1, wherein said polymer further comprises chiral groups.

6. The composition of claim 1, wherein said polymer further comprises sufficient chiral groups to impart said noncentrosymmetry to said polymer.

7. The composition of claim 1, wherein said polymeric backbone includes chiral groups.

8. The composition of claim 1, wherein said polymeric backbone includes chiral 1-methyl-1,3-propylene or 3-methyl-1,6-hexylene groups.

9. The composition of claim 1, in which the polymeric backbone comprises a polyester.

10. The composition of claim 1, further comprising flexible spacers attaching said pendant groups to said polymeric backbone.

11. The composition of claim 10 in which the spacers comprise polymethylene groups.

12. The composition of claim 1, wherein said polymer exhibits nonlinear optical response upon interaction with electromagnetic radiation.

13. The composition of claim 1, wherein said polymer exhibits nonlinear optical second harmonic generation upon interaction with electromagnetic radiation.

14. The composition of claim 1, wherein said polymer comprises sufficient chiral groups to exhibit second harmonic generation upon interaction with electromagnetic radiation without electric field poling.

15. The composition of claim 1, in which the pi-electron donor comprises oxygen or nitrogen.

16. A composition of matter, comprising a liquid crystalline, noncentrosymmetric polymer which includes:
a polymeric backbone;
a plurality of first pendant groups attached at intervals along the backbone, wherein said first pendant groups comprise a pi-electron donor and a pi-electron acceptor that comprises $NO_2$ or CN and is conjugatively connected to the pi-electron donor; and
a plurality of second pendant groups attached at intervals along the backbone, wherein said second pendant groups comprise chiral groups.

17. The composition of claim 16, wherein said chiral groups includes an alkoxy group.

18. A composition of matter, comprising a liquid crystalline polymer that has a polymeric backbone and a plurality of dipolar pendant groups attached at intervals along the backbone; wherein said dipolar pendant groups comprise a pi-electron donor and a pi-electron acceptor that is conjugatively connected to the pi-electron donor and comprises $NO_2$ or CN; and wherein said dipolar pendant groups have been electrically poled to provide noncentrosymmetry to said polymer.

19. A composition of matter, comprising a liquid crystalline, noncentrosymmetric polymer having a polymeric backbone and a plurality of dipolar pendant groups attached at intervals along the backbone; wherein said dipolar pendant groups comprise a pi-electron donor and a pi-electron acceptor that is conjugatively connected to the pi-electron donor and comprises $NO_2$ or CN; and wherein said polymer additionally comprises chiral groups.

20. The composition of claim 18 wherein said composition provides nonlinear optical response upon interaction with electromagnetic radiation.

21. The composition of claim 19 wherein said composition provides nonlinear optical response upon interaction with electromagnetic radiation.

22. A liquid crystalline polymer which comprises:
a polymeric backbone;
a plurality of dipolar pendant groups spaced along and attached to the backbone wherein said pendant groups include a pi-electron donor and a pi-electron acceptor which is conjugatively connected to the pi-electron donor and wherein said pi-electron acceptor comprises $NO_2$ or CN; and
wherein said polymer has sufficient dipolar orientation or chirality to render the polymer noncentrosymmetric.

23. The polymer of claim 22 wherein said pi-electron acceptor comprises a nitrophenyl or nitropyridyl group.

24. The composition of claim 22, wherein said polymer exhibits nonlinear optical response upon interaction with electromagnetic radiation.

25. The composition of claim 22, wherein said polymer exhibits nonlinear optical second harmonic generation upon interaction with electromagnetic radiation.

26. The polymer of claim 22, additionally comprising spacers for attaching the backbone to the pendant groups.

27. The polymer of claim 22, additionally comprising spacers for attaching the backbone to the pendant groups, wherein said spacers are sufficiently flexible to increase liquid crystalline behavior in the polymer, and wherein said polymer has been electrically poled to provide said noncentrosymmetry to said polymer.

28. The polymer of claim 22, additionally comprising spacers for attaching the backbone to the pendant groups, wherein said spacers are sufficiently flexible to increase liquid crystalline behavior in the polymer, and wherein said polymer contains sufficient chiral groups to exhibit nonlinear optical second harmonic generation without the need for electric field poling.

29. The polymer of claim 22, additionally comprising sufficient chiral groups in said polymer to provide said chirality.

30. The polymer of claim 22 wherein said pendant groups have been oriented by an external electric field.

31. The polymer of claim 22 in which the backbone comprises a polyester.

32. The polymer of claim 22 in which the backbone comprises a polyester having the following repeatedly group:

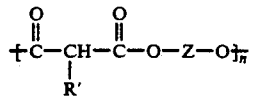

wherein Z is 1,4-butylene or 1-methyl-1,3-propylene or 3-methyl-1,6-hexylene; n is an integer; and R' comprises a flexible space capable of attaching said pendant groups to said backbone.

33. The polymer of claim 22 in which the pendant groups comprise nitrostilbene.

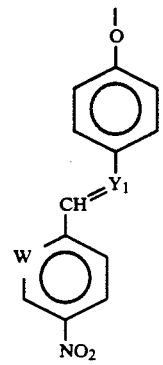

wherein $Y_1$ is CH or N and W is CH or N.

34. The polymer of claim 22 in which the pendant groups comprise nitrostilbene.

35. A noncentrosymmetric polymer comprising the following structure:

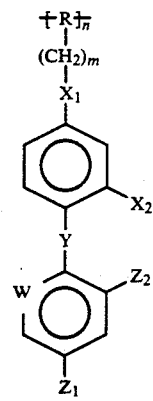

wherein $X_1$ is a pi-electron donor; $Z_1$ is $NO_2$ or CN; Y is a linking group capable of transmitting pi-electron density from $X_1$ to $Z_1$; W is CH or N; $X_2$ or H; $Z_2$ is $NO_2$ or H; m and n are integers of at least 2; and R is the repeating unit of the polymer backbone.

36. The polymer of claim 35 in which R has the following structure:

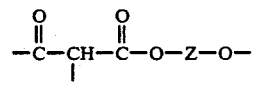

wherein Z is 1-methyl-1,3-propylene or 3-methyl-1,6-hexylene.

37. The polymer of claim 35 in which $X_1$ is oxygen or nitrogen.

38. The polymer of claim 35 in which Y is:

—CH=CH— (trans); —CH=N— (trans);

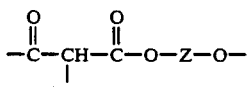

—C≡C—; or —COO—.

39. A polymer comprising:

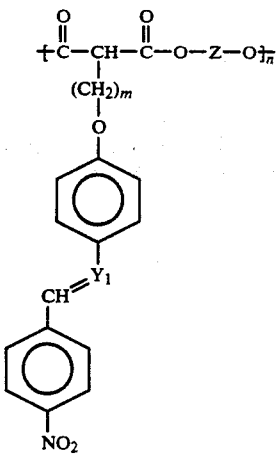

wherein m and n are integers; Z is 1,4-butylene or 1-methyl-1,3-propylene or 3-methyl-1,6-hexylene; and Y is CH or N.

40. The polymer of claim 35 in which R has the following structure:

$$-\overset{O}{\underset{\|}{C}}-CH-\overset{O}{\underset{\|}{C}}-O-Z-O-$$

wherein Z is 1,4-butylene, 1-methyl-1,3-propylene, or 3-methyl-1,6-hexylene.

* * * * *

UNITED STATES PATENT AND TRADEMARK OFFICE
CERTIFICATE OF CORRECTION

PATENT NO. : 5,207,952
DATED : May 4, 1993
INVENTOR(S) : Anselm C. Griffin, III

It is certified that error appears in the above-identified patent and that said Letters Patent is hereby corrected as shown below:

In column 13, line 67, "repeatedly" should be --repeating--.

In column 14, line 12, please delete "nitrostilbene".

In column 14, line 55, after "$X_2$", insert -- is $X_1$ --.

Signed and Sealed this

Twentieth Day of December, 1994

Attest:

BRUCE LEHMAN

Attesting Officer

Commissioner of Patents and Trademarks